US006917689B2

(12) United States Patent
Cheng

(10) Patent No.: US 6,917,689 B2
(45) Date of Patent: Jul. 12, 2005

(54) SOUND MIXING EQUIPMENT

(75) Inventor: Lung-En Cheng, Tainan Hsien (TW)

(73) Assignee: Hanpin Electron Co., Ltd., Tainan (TW)

( * ) Notice: Subject to any disclaimer, the term of this patent is extended or adjusted under 35 U.S.C. 154(b) by 538 days.

(21) Appl. No.: 10/207,238

(22) Filed: Jul. 30, 2002

(65) Prior Publication Data

US 2004/0022402 A1 Feb. 5, 2004

(51) Int. Cl.$^{7}$ .................................................. H04B 1/00
(52) U.S. Cl. ........................................... 381/119; 369/4
(58) Field of Search ................................ 381/119, 109; 369/3, 4; 704/94

(56) References Cited

U.S. PATENT DOCUMENTS 4,051,365 A * 9/1977 Fukuyama et al. ...... 250/222.1
4,573,110 A * 2/1986 Drumm ...................... 362/319
4,833,318 A * 5/1989 Yonekura et al. ........... 250/239
4,888,532 A * 12/1989 Josson ........................ 318/480
5,719,570 A * 2/1998 Breitbarth .................... 341/13

* cited by examiner

*Primary Examiner*—Xu Mei
*Assistant Examiner*—Con P. Tran
(74) *Attorney, Agent, or Firm*—Rosenberg, Klein & Lee

(57) ABSTRACT

In a sound mixing equipment, an adjusting circuit has reflecting plates joined to a control in opposite directions. The adjusting circuit has a first light emitting diode and a first light transistor disposed to face one of the reflecting plates, and a second light emitting diode and a second light transistor disposed to face other one of the reflecting plates. Distance from the light emitting diodes to the corresponding reflecting plates is changed by means of shifting the control, making the light transistors receive infrared rays reflected by the plates at adjusted distance to have desired amount of electrical currents. Channels and output terminals of the light transistors are connected to input terminals of sound mixing mechanism. Thus, proportion of sound signals of the channels to be mixed is adjusted.

1 Claim, 4 Drawing Sheets

SOUND MIXING EQUIPMENT

BACKGROUND OF THE INVENTION

1. Field of the Invention

The present invention relates to a sound mixing equipment, more particularly a sound mixing equipment, which is provided with a manually activated control constructed such that it is not subject to wear that is prone to occur on conventional manually activated controls having variable resistors.

2. Brief Description of the Prior Art

In order to help increase hot and exciting atmosphere in a concert or a party such as is held in a PUB or a dancing hall, the DJ would produce special sound effects by mixing input sound signals into output sound signals with a sound mixing equipment which includes separate manually activated controls for each sound input signal. The sound input signals may include signals from several musical instruments and voices. The sound output signals may be provided to speakers.

Referring to FIG. 4, a conventional sound mixing equipment 5 includes an attenuation circuit 51, and a stereophonic sound mixing circuit 52. The attenuation circuit 51 includes resistors 511, 512, 513, and 514. The stereophonic sound mixing circuit 52 includes resistors 521, 522, 523, and 524, and amplifiers 525, and 526. A first channel, and a second channel are connected to musical instruments or record players. The first channel has a right channel, and a left channel connected to the resistor 513, and the resistor 511 respectively. The second channel has a right channel, and a left channel connected to the resistor 514, and the resistor 512 respectively. The attenuation circuit 51 is connected to a first variable resistor 515 disposed between the resistors 511 and 512, and to a second variable resistor 516 disposed between the resistors 513 and 514 so that it in parallel with the variable resistors 515 and 516. Then, the resistors 511, 512, 513, and 514 are connected to the resistors 521, 522, 523, and 524 of the stereophonic sound mixing circuit 52 respectively. And, the resistors 521, 522, 523, and 524 plus adjustable conducting legs of the variable resistors 515 and 516 are connected to corresponding conducting legs of the amplifiers 525, and 526. Manually operated controls (not shown) are joined to the adjustable conducting legs of the variable resistors 515 and 516.

In using the sound mixing equipment, referring to FIGS. 4, and 5, the users move the manually operated controls to adjust resistance at each section of the variable resistors 515, 516. When resistances at both sections of each of the variable resistors are equal, the input sound signals are mixed into output sound signals in which signals from the first channel and those from the second channel are of equal volume. When resistance at one section of the variable resistor 515 or 516 is bigger than resistance at the other section, there will be bigger volume of sound signals from the channel connected to the latter section in the output sound signals. When resistance at one section of the variable resistor 515 or 516 is zero, and resistance at the other section equals entire resistance of the resistor, there will be no sound signals from the channel connected to the latter section in the output sound signals.

However, this sound mixing equipment is found to have a disadvantage that the variable resistors are subject to oxidation at contacts. And, wear and loss of elasticity are prone to occur on the variable resistors because the adjustable conducting legs of the variable resistors are moved relative the other portions frequently in operating the sound mixing equipment. Consequently, the electrical contact becomes loose.

SUMMARY OF THE INVENTION

It is a main object of the present invention to provide a sound mixing equipment, which has a manually operated control constructed such that it is not subject to wear and oxidation like conventional ones.

The present sound mixing equipment has an adjusting circuit, and a control having reflecting plates joined thereto in opposite directions. The adjusting circuit has a first light emitting diode and a first light transistor disposed to face one of the reflecting plates, and a second light emitting diode and a second light transistor disposed to face the other reflecting plate. By means of shifting the control, the light transistors receive infrared rays reflected by the plates at adjusted distance to have desired amount of electrical currents so that sound signals of the channels can be mixed with adjusted proportion. Therefore, the present control takes the place of conventional variable resistors subject to wear and oxidation at contacts.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
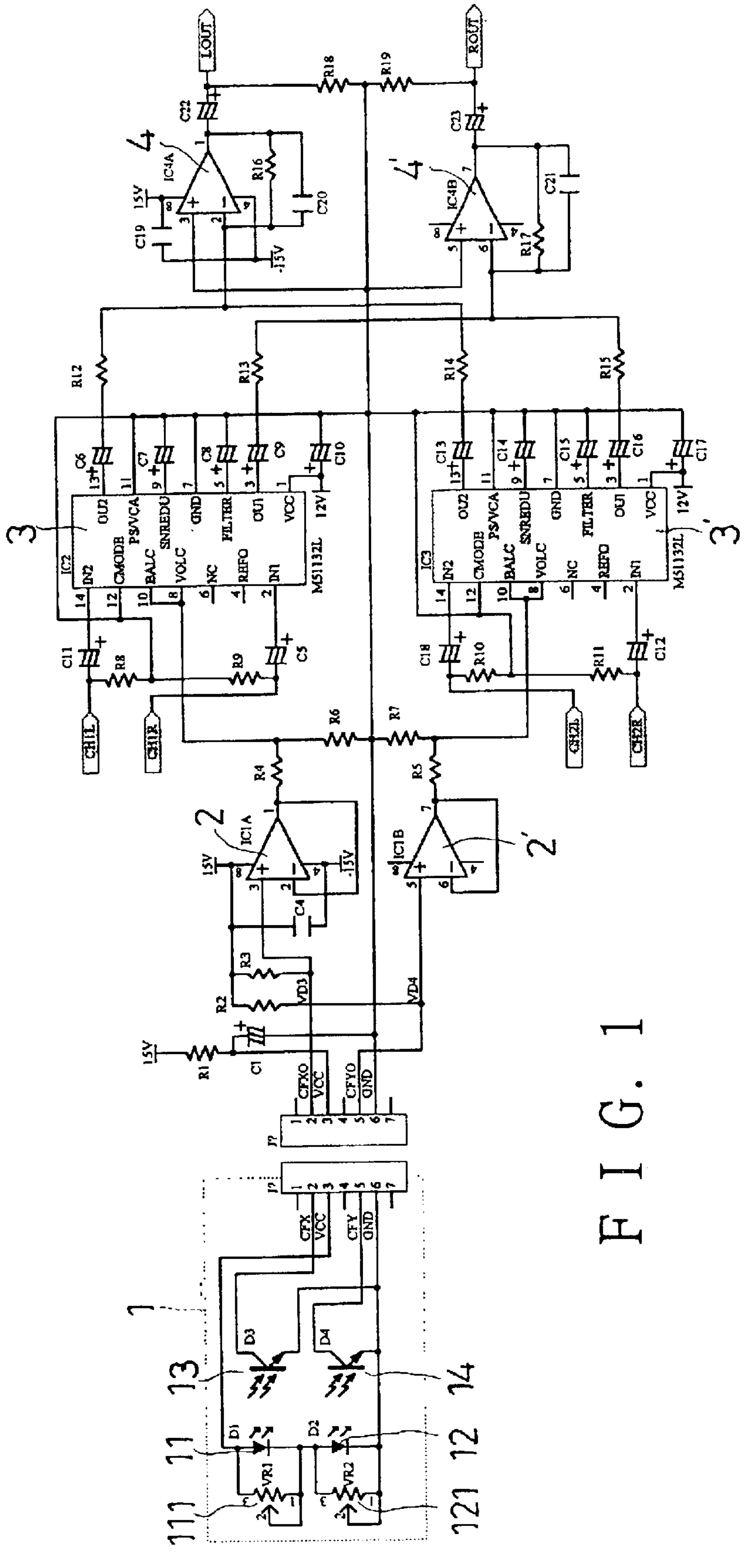
FIG. 1 is a circuit diagram of the sound mixing equipment of the present invention.
Figure 2:
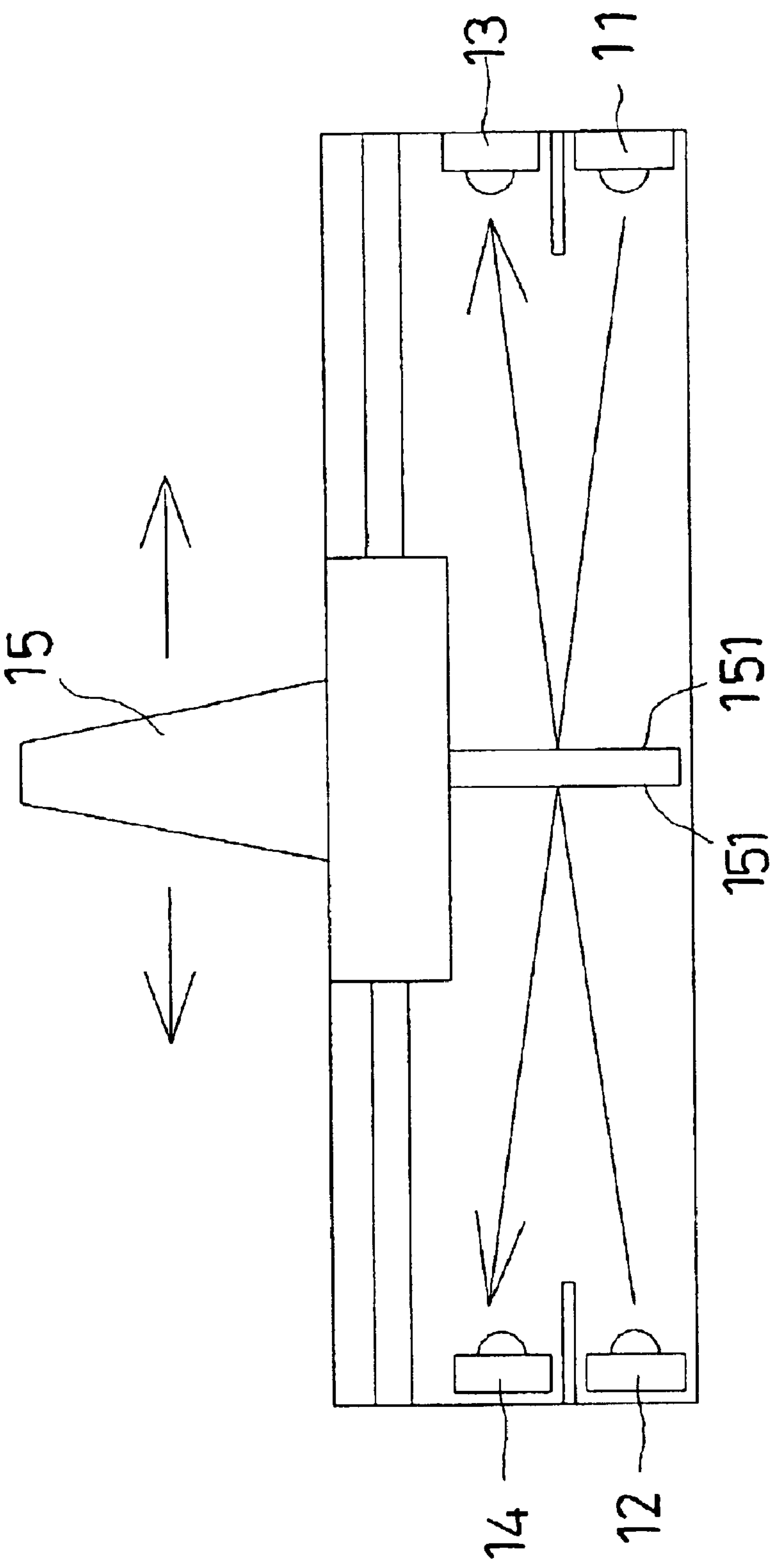
FIG. 2 is a plan of the control of the sound mixing equipment of the present invention.
Figure 3:
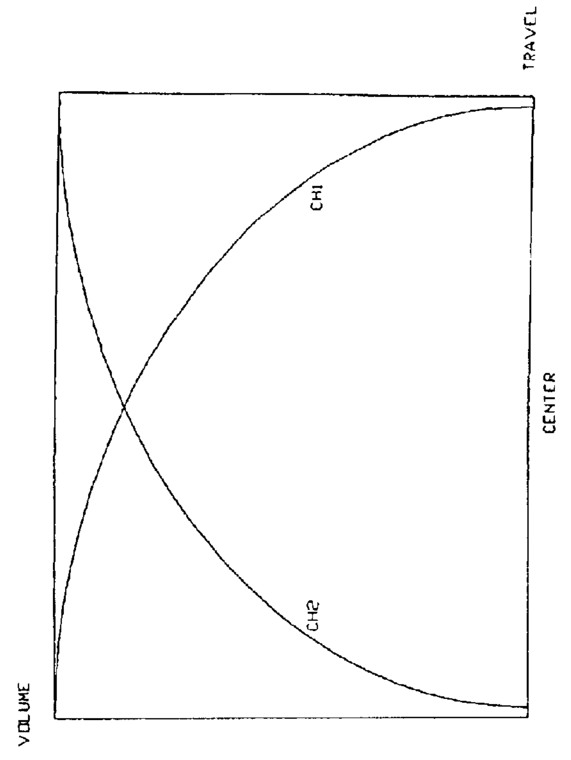
FIG. 3 is a diagram of outputting of sound signals from the sound mixing equipment of the present invention.
Figure 5:
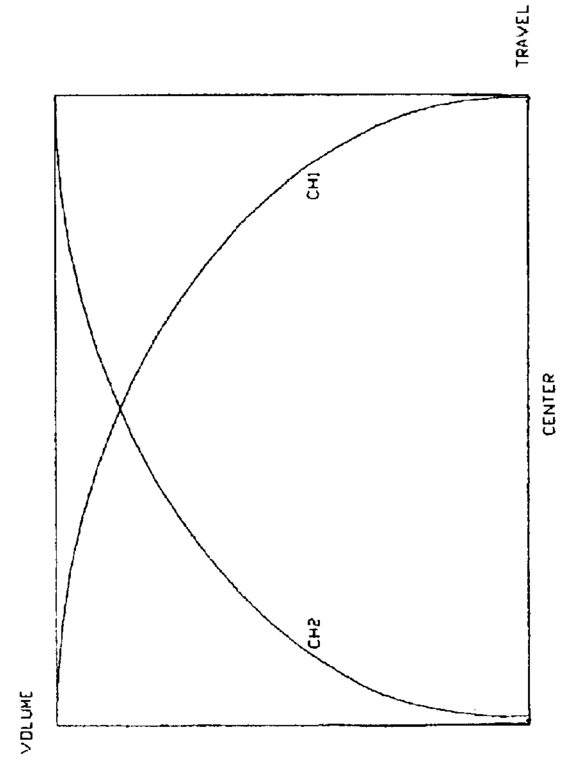
FIG. 5 (PRIOR ART)
FIG. 5 is a diagram of outputting of the sound signals from the conventional sound mixing equipment.
Figure 4:
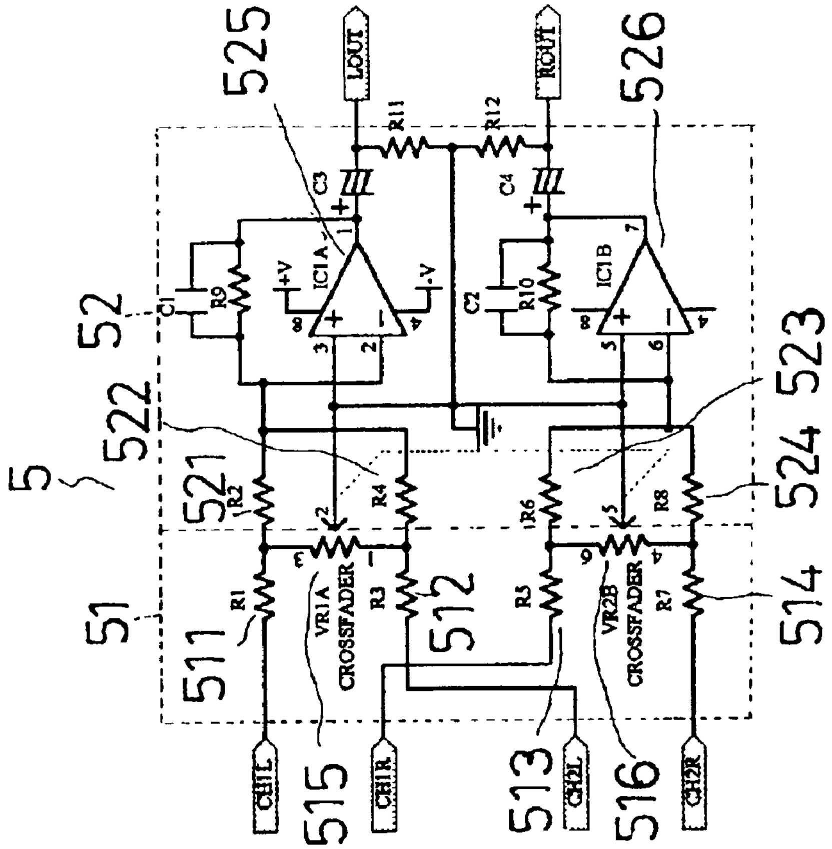
FIG. 4 (PRIOR ART)
FIG. 4 is a circuit diagram of the conventional sound mixing equipment as described in the Background.

Referring to FIGS. 1 and 2, a sound mixing equipment of the present invention includes an adjusting circuit 1, buffers 2, 2', voltage control amplifiers 3, 3', and amplifiers 4, 4'.

The adjusting circuit 1 includes two light emitting diodes 11, and 12, and two light transistors 13, and 14. The light emitting diode 11 and the light transistor 13 are disposed on one inner side of a housing, and the light emitting diode 12 and the light transistor 14 are disposed on an opposite inner side of the housing. The light emitting diodes 11, and 12 are connected in parallel to variable resistors 111, and 121 respectively.

A manually operated control 15 is movably fitted to the housing. Reflecting plates 151 are joined to the manually operated control 15 so that they are disposed in the housing, and face the light emitting diodes 11, 12, and the light transistors 13, 14. The light emitting diodes 11, 12 emit light, and the light is reflected to the light transistors 13, and 14 by means of the reflecting plates 151. By means of moving the control 15 to change position of the reflecting plates 151, distance from the light emitting diodes 11, 12 to the reflecting plates 151 is changed; thus, distance is adjusted that light have to travel from the light emitting diodes to the corresponding light transistors. The light transistors will sense increased intensity of light, and therefore have more electrical currents when the light reflecting plates 151 are moved closer to it, and vice versa.

Input terminal of the buffer 2 is connected to output terminal of the adjusting circuit 1, while input terminal of the buffer 2' is connected to output terminal of the adjusting circuit 1. Output terminal of the buffer 2, and a right channel and a left channel of a first channel are connected to input terminals of the voltage control amplifier 3. Output terminal of the buffer 2', and a right channel and a left channel of a second channel are connected to input terminals of the voltage control amplifier 3'. The first channel, and the second channel are further connected to musical instruments or record players.

Input terminals of the amplifiers 4, 4 are connected to output terminals of the voltage control amplifiers 3, 3. Mixed sound signals are sent out through the amplifiers 3, 3.

In using the sound mixing equipment of the present invention, the variable resistors 111, 121 are adjusted so that the light emitting diodes 11, 12 can emit infrared rays of desired brightness when activated. The light emitting diodes 11, 12 are activated to emit infrared rays, which are then reflected to the corresponding light transistors 13, 14 by the reflecting plates 151. The manually operated control 15 is moved relative to the housing so that the light transistors 13, 14 each receives changing intensity of infrared rays from the corresponding light emitting diodes 11, 12; as can be easily seen, the bigger the intensity of light one of the light transistors is receiving, the smaller the intensity of light the other light transistor will receive. The light transistors will have more electrical currents when the control 15 is moved closer to it. Thus, sound output of the amplifiers 4, 4 is made to include sound signals of the first and the second channels of desired proportions by means of the adjusting circuit 1.

From the above description, it can be easily understood that the present sound mixing equipment has a manually operated control not subject to wear like the conventional one having variable resistors as described in the background. Therefore, the present sound mixing equipment has relatively long service life as compared with the conventional one.

What is claimed is:

1. A sound mixing equipment, comprising an adjusting circuit having output terminals and input terminals;

two buffers connected to the output terminals of the adjusting circuit at input terminals thereof;

a first and a second voltage control amplifiers connected to output terminals of a respective one of the buffers at input terminals thereof;

the first and the second voltage control amplifiers being connected to a left channel and a right channel of a first channel, and those of a second channel respectively at input terminals thereof;

two amplifiers each connected to output terminals of one of the voltage control amplifiers at input terminals thereof;

the adjusting circuit having reflecting plates joined to the manually operated control in opposite directions; the adjusting circuit having a first light emitting diode and a first light transistor disposed to face one of the reflecting plates, and a second light emitting diode and a second light transistor disposed to face other one of the reflecting plates; distance from the light emitting diodes to the corresponding reflecting plates being changed by means of moving the manually operated control, making the light transistors receive infrared rays emitted from corresponding light emitting diodes and reflected by the plates at adjusted distance to have desired amount of electrical currents due to the infrared rays so that proportion of sound signals of the corresponding channels to be mixed is adjusted.

* * * * *